United States Patent Office 3,518,052
Patented June 30, 1970

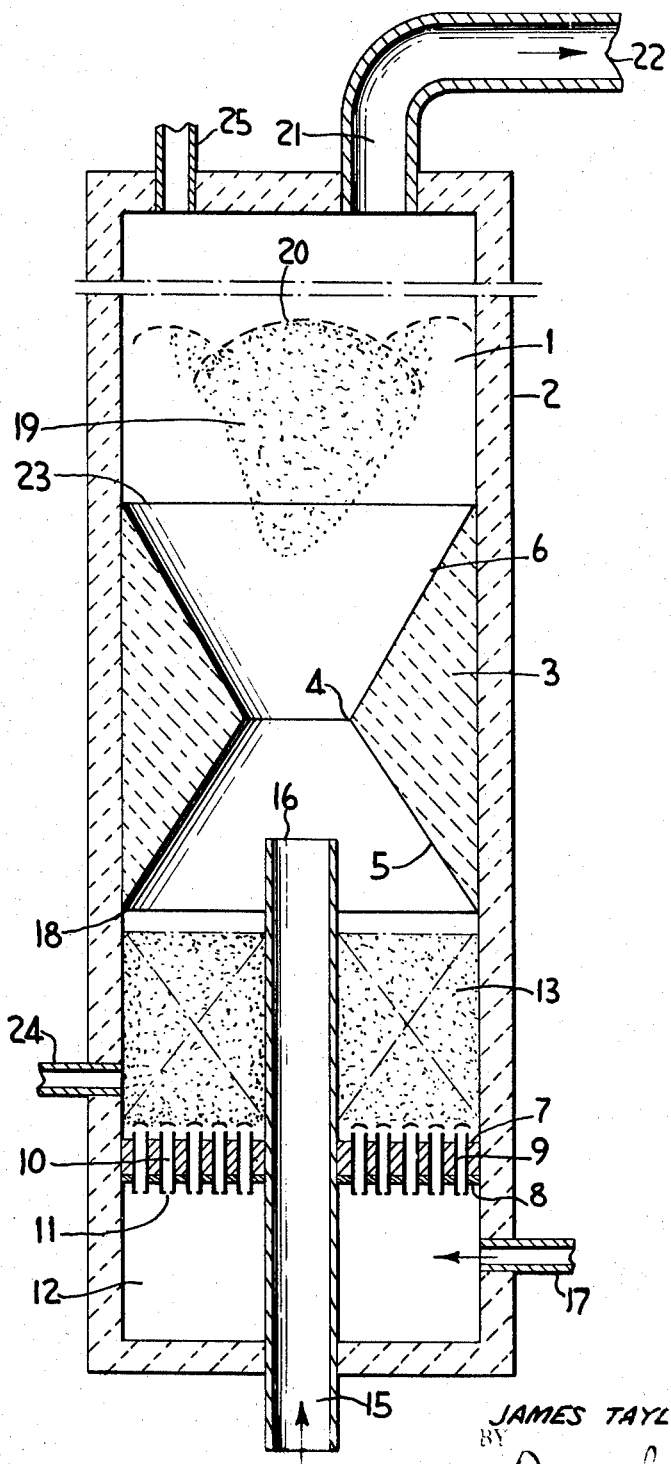

---

3,518,052
PROCESS OF PRODUCING METAL OXIDE IN VAPOUR PHASE OXIDATION OF A METAL CHLORIDE
James Taylor Foulds, Stockton-on-Tees, England, assignor to British Titan Products Company Limited, Durham, England, a corporation of Great Britain
Continuation of application Ser. No. 800,177, Mar. 18, 1959. This application Feb. 18, 1963, Ser. No. 259,171
Claims priority, application Great Britain, Mar. 21, 1958, 9,197/58
Int. Cl. C01g 1/02, 23/04
U.S. Cl. 23—202                                    12 Claims

---

ABSTRACT OF THE DISCLOSURE

A metal halide and oxygen are reacted in an upwardly directed stream. Hot inert particles separate from the upper portion of the stream and fall downwardly around the stream. Desirably, the hot inert particles are recombined with the lower portion of the reaction stream in order to add heat thereto. The process is particularly suitable for the production of titanium dioxide pigments.

---

RELATED APPLICATIONS

This application is a continuation of application Ser. No. 800,177, filed Mar. 18, 1959, now abandoned, and claims priority based on British application 9,197/58, filed Mar. 21, 1958.

This invention relates to a process of sustaining reaction between reactants at least one of which requires preheating to initiate the reaction.

The invention is of particular interest in connection with the vapour phase reaction of titanium tetrachloride and oxygen or oxygen-containing gases and we will therefore discuss this in the first place.

Many processes have been projected to effect the production of titanium dioxide by reaction of titanium tetrachloride and oxygen or oxygen-containing gases by vapour phase reaction. The earlier processes related to direct admission of the gases into an empty chamber, usually in a way such that the reaction was substantially complete before the gases could contact solid surfaces. Such processes have been fraught with many difficulties especially when production of titanium oxide of controlled physical form was involved. Moreover, although the heat evolved by the reaction of titanium tetrachloride with oxygen is more than sufficient to maintain the reaction, it was not found possible to utilise the heat generated to this end. In consequence some form of auxiliary heating i.e. by applying heat externally through the walls or by preheating the gases or by producting heat internally by, for instance, the combustion of fuel in situ, was employed.

In a more recent development, i.e., in British patent specification 761,770, it has been shown that the reaction may be conducted within a fluidised bed of sand or the like which is substantially inert to the action of hot chlorine or chlorine-containing gases. This opens up the possibility, by using a shaft furnace of adequate size and construction, of using the heat generated by the reaction and stored in the bed to maintain the reaction without recourse to any form of auxiliary heating. In this method, however, it has been found that whilst a large proportion of the titanium dioxide produced in the fluidised bed is entrained in the chlorine gases simultaneously produced, there is a considerable proportion of the reactant titanium dioxide adhering to the sand or other substrate material in the bed and not being readily recoverable.

The basis of the present invention is the discovery that the desired heat transfer can be effected by means of sand or other solid particulate material which receives heat, to be supplied afterwards to the reactants, whilst sweeping the reaction zone in such a dispersed state that its total volume, at any time, is only a small proportion of the volume of that zone. This dispersed state of the sand or like material is, of course, quite distinct from the dense state of dispersion which obtains in a fluidised bed.

Accordingly the process of the invention for sustaining an exothermic reaction between reactants at least one of which requires heating in order to enter into the reaction comprises progressively feeding the reactants into a reaction zone, progressively discharging gases containing reaction products from the reaction zone, and circulating particulate heat-exchange solid material (hereinafter referred to for convenience as "sand") to effect said heating at one stage and, at another stage, to sweep said gases and receive heat generated by the reaction. It will be understood that the term "gases" includes vapours.

A stream of the reactants, or at least one of them, may pass through an initial zone leading to the reaction zone, the sand being entrained in the stream and transmitting heat to the reactants so as to bring about reaction in the reaction zone and reheat therein the sand which then separates from the gases in or beyond the reaction zone and returns to the initial zone. The initial zone is preferably below the reaction zone and the sand rises against gravity into the reaction zone and falls back with gravity into the initial zone. The reaction zone is desirably a chamber which has an upper part of greater internal cross section than a lower part thereof so that deceleration of the flow of the gaseous medium will assist the fall-back of the sand. There may be a bed of the sand at the bottom of the initial zone and particles of the material may be lifted out of the bed by forcing gas up through the mass of material in the bed.

In carrying out the process as has just been outlined, it is preferred that the stream of reactants shall be caused to pass through a constriction having the effect of first accelerating the movement of the stream and thus promoting the entrainment of the sand, and then decelerating the stream and thus promoting the separation of the sand from the gases in the reaction zone. When there is a bed of sand at the bottom of the initial zone the top of the bed is preferably located below and adjacent to the constriction. This constriction may be a passage or passages tapering upwardly to a throat or throats and having, or each having an upwardly flared mouth above the throat to assist the fall-back of sand.

There are various other ways in which a process according to the invention may be performed. For example the sand may be entrained in the feed of reactants and thereafter separated from the gaseous medium of the reaction product in a centrifugal separator from which it is recycled outside the reaction zone to be re-entrained in the feed. Alternatively a stream of reactant gases may be directed downwards into a bed of sand so that the direction of flow of the gases is reversed and the gases rise entraining at least some of the sand and forming an upward spray of sand which then separates from the gases in the reaction zone and returns to the bed. According to a further alternative, the sand is showered down through the reaction zone and then recycled back again to the top of the reaction zone, the gaseous reactants being passed up through the reaction zone countercurrent to the sand, the latter receiving heat from the gaseous product rising in the upper part of the reaction zone and then serving to preheat the gaseous reactants rising in the lower part of the reaction zone.

We will now describe more specifically the application of the invention to the exothermic reaction between titanium tetrachloride vapour and oxygen.

The oxidation of titanium tetrachloride vapour with oxygen or oxygen-containing gases is conducted in an adequately dimensioned shaft furnace, characterised by having a constriction through which the oxygen-containing gases entrain sand from the bed below and titanium tetrachloride vapour is injected into the entrained stream so that reaction takes place in a zone above the constriction and in a fountain of sand projected up by the stream and falling down again.

The reactor, which is of adequate size to be described later, consists generally of a vertical shaft furnace normally cylindrical in section, having within it a constriction which is preferably but not essentially a throat preceded by a converging passage and succeeded by a diverging passage, both of conical or like form. At the bottom of the shaft is a perforated plate which separates the furnace from the wind box below. Also passing through the wind box and the perforated plate (or alternatively led in from the side below the throat) is a centralised ducting which is normally axial with the furnace terminating at its upper end just below the aforesaid constriction or throat. The upper part of the furnace is sealed with a ducting leading therefrom to convey the products of reaction optionally to suitable cooling, collecting or separating chambers. With respect to the dimension of the furnace, this will be adequate to allow for the heat of reaction to maintain the reaction without recourse to auxiliary heating. That is to say the heat generated therein will be sufficient to preheat the reactants and overcome heat losses to the surroundings. The size of furnace involved is largely a matter of chemical engineering design, bearing in mind the insulating properties of the materials of construction.

The perforated plate assembly consists of a metal plate surmounted by an insulating brick, cement, or other suitable ceramic material which serves to heat insulate the furnace from the metal plate supporting it and the wind box below. Corresponding to the perforations in the plate there are vertical bores in the insulating block serving to distribute air, or oxygen gases, from the wind box to the furnace. Such bores are associated with constriction orifices affixed preferably on the under (wind box) side of the metal plate so as to control the gas distribution evenly over the whole of the perforated plate assembly. The passageways through the metal plate and the insulating block above, should be of such diameter that gases passing through will be above the terminal velocity for the bed material immediately above. Alternatively, instead of making the passageways of limited diameter, each bore, or a tube filled therein, may terminate in a suitable device for preventing solids from falling down the passageways. Devices of this description are described in British Pat. 724,193 and in copending United States applications Ser. No. 565,251, filed Feb. 13, 1956, and Ser. No. 686,511, filed Sept. 26, 1957.

Above the perforated plate is inserted a bed of inert material having the character of sand, i.e., with particles preferably not less than 76 microns and usually not greater than 1000 microns, such material consisting of silica, zircon, mineral rutile, alumina or like material consisting of massive rock which is substantially inert under the conditions obtaining within the furnace, during vapour phase oxidation.

In the operation of the above described shaft furnace assembly, the sand material is preheated in any known manner usually by fluidising it with oxygen gas through the wind box and injecting into the bed a gas poker or other device whereby gas is combusted with the uprising oxygen gases. In this way, the temperature of the furnace is raised to about 1000° C., the sand throughout the heating up operation being maintained in a fluidised condition. The gas poker is then removed and the oxygen flow is increased so that at and beyond the point where the constriction in the furnace commences to converge towards the throat, its velocity is greater than the terminal velocity of the sand and thus the latter is projected upwards and entrained with the gas through the throat. It will be seen that the velocity increases up to the narrowest section of the throat and thereafter the velocity of flow will decrease as the stream passes upward beyond, i.e. into zone above the throat where the cross section increases. Thus, a substantial part of the solids composing the bed becomes entrained below the throat and carried upwards beyond the throat in a kind of fountain. In the further upward progress of the sand the gas velocity decreases and eventually the velocity falls below the critical so that the solids settle out and return downwards, tending to descend near or along the sides or walls of the chamber where the gas velocity is least. It will be appreciated that the gas will continue to flow up beyond the diffusion of sand and be carried out through the top of the furnace substantially free from sand. Having established these conditions in the zone above the throat, titanium tetrachloride vapour at a temperature usually not less than 150° C. (in order to avoid condensation) is led up through a conduit which is approximately axial with the furnace at the point of discharge usually just short of the throat. In this way vapour is injected directly into the sweep of sand above the throat and, at the temperature conditions already established, reacts immediately with the uprising oxygen gases to form titanium oxide and chlorine as per the equation $TiCl_4 + O_2 \rightarrow TiO_2 + 2Cl_2$. The reaction is substantially complete before the reactants leave the zone in which sand is still dispersed and thereafter the products of reaction, i.e., chlorine or chlorine-containing gases, divested of the sand constituent but containing substantially all the titanium oxide in suspension or in form of entrainment are led off from the top of the furnace to, for example, suitable cooling, separating and collecting chambers. It will be obvious that once the above conditions have been established the reaction may be maintained continuously.

The process, as described above in some detail, may be more clearly appreciated by the following description with reference to the accompanying diagrammatic drawing:

A cylindrical shaft furnace 1 provided with a suitably insulated wall 2 has a baffling 3 having a narrowest point or throat located at 4 and having a lower converging conical section 5 below the throat and a diverging conical section 6 above the throat. This constitutes a constriction as already described. The base of the furnace is sealed by a perforated plate 7 which is constructed of a metal plate 8 surmounted by an insulated ceramic block 9 through which there are bores or tubes 10 corresponding to the perforations in the metal plate. On the lower side of the metal plate are located plugs 11 through which there are gas pressure controlling machined orifices for permitting predetermined supplies of gas from the wind box 12 below to pass upward into a bed 13 above the ceramic block. Optionally the bores or tubes in the insulated ceramic block may be shielded at the top or fitted with gas-permeable solids-impermeable caps (indicated at 30) for preventing the downfall of solids from the bed.

Titanium tetrachloride vapour is led through the conduit 15 constructed axially with respect to the shaft and passing through the perforated plate 8 and ceramic block 9. The conduit 15 terminates at the point 16 centrally below the throat 4. The oxygen gases enter through conduit 17 into the wind box 12 and pass upward through the bores 10 into the bed 13.

In operation the bed of material 13 above the perforated plate and ceramic block assembly is fluidised by oxygen gases fed via the conduit 17 and the wind box 12. A gas poker (not shown) is temporarily inserted into the bed for supply of fuel gas to be burnt therein and hence to raise the temperature of the furnace to approximately 1000° C.

The gas poker is then removed and the velocity of oxygen gases entering from the wind box 12 into the bed 13 is increased so that at a height in the furnace corresponding to 18 where the constriction in the furnace in the form of a converging cone 5 is reached, the velocity of the gases rises above the terminal velocity and thus the sand or sand-like material composing the bed is entrained upwards through the throat 4 to form what may be regarded as a fountain of sand which is shown diagrammatically by the dotted area immediately above the throat, i.e., sweeping in the space 19. At a height corresponding to a point 20 the velocity of the gases having decreased below the terminal velocity the sand is in a state of settlement and beyond this area virtually cease to contain sand in suspension and thus the gases emerging through the outlet 21 are substantially free from sand. With these conditions established the titanium tetrachloride vapour at temperatures preferably above 150° C. but not exceeding 600° C. is led through the conduit 15 and injected at the point 16 directly through the throat 4 to be preheated and then reacted with oxygen in the space 19 which is pervaded by the sand. At the level 20 where the reaction is substantially complete and the gases are divested of the sand constituent, the products of reaction which consist in the main of fine precipitated titanium dioxide solid suspended in an atmosphere of substantially chlorine or chlorine-containing gases are conveyed through the outlet 21 onwards through ducting 22 to be further treated, e.g., cooled, collected and/or separated.

In the process as operated above it will be obvious that the sand of the bed is largely conveyed upward into the space 19 above the constriction or throat 4 where it is continuously in circulation and in the main in a cloud-like formation. The sand would appear to take the course of being picked up by the up-rising gases at a point at or near the throat and to be entrained possibly in a form of an expanding cone but mainly in the central part of the chamber to the level 20 where, due to the falling velocity of the gases settlement takes place and the sand tends to gravitate towards the periphery where it falls back into the throat probably mainly down the walls 23 whereupon, on reaching the point close to the throat, it becomes re-entrained by the uprising gases and carried upward in the main stream. Thus, by this means the sand is maintained in continuous motion partly in a highly dispersed state partly in settlement by gravitation and thereafter again in high dispersion, thereby establishing a circulatory system.

It is found that whilst a proportion of sand remains in the lower part of the chamber below the throat, i.e. above the perforated plate assembly, there is substantially no reaction taking place in this part of the shaft. In effect reaction is unlikely to take place as the lower part of the chamber tends to become relatively cool by virtue of the cool gas passing upwards through the perforated plate, thus the reaction zone is substantially in that part of the chamber which is above the constrictive throat 4. The lower section of the furnace obviously has its ancillary uses in retaining and holding the sand component of the bed especially when for any given reason the gas flow (i.e., oxygen supply) is temporarily arrested and enables quick resumption of the process when desired.

The titanium oxide precipitated on to the surface of the sand in the process of the invention is much lower in proportion than that which takes place in a corresponding fluidised bed vapour phase oxidation reaction. There will however be some accretion or accumulation of titanium oxide on the sand and, in consequence, it will, from time to time, be necessary to purge some of the sand from the bed. There is accordingly provided a discharge port 24 and an inlet port 25 for fresh sand.

It will be appreciated that in the operation of this process, it is difficult to give details of conditions within the reaction zone. Thus, immediately above the throat, especially in the divergent conical section, there will be a gas preheating zone—i.e., the cool gases, both oxygen and titanium tetrachloride, passing through the throat will be preheated by the hot falling sand which they pick up and re-entrain. It will be obvious, therefore, that the reaction will set in at some distance above the throat and that the maximum temperature will be attained still higher up. As the gases pass through the throat and thus tend to flow upwards along the axis, and also as the gas velocities would in any case reduce near the periphery, it follows that the reactant gases will tend to pass up the furnace in an expanding conical stream from the throat but without being directed towards the periphery, and hence reaction will tend to take place out of contact with the containing walls of the furnace.

As the process will operate automatically on a large scale it is not necessary to preheat the incoming gases other than to avoid condensation of the titanium tetrachloride.

It will also be appreciated that there are many conditions which may be introduced in order to control the reaction. Such conditions are, for instance, the temperature of the gases fed in, the actual velocity ranges in which the reaction is conducted, the proportion of sand which is to be employed in a reactor of known capacity. Less easily controllable factors are the shape and design of the throat and the diameter of the ducting 15 for introducing titanium tetrachloride which in turn determines the velocity of the vapour at the port of introduction and also the position of the tip 16 in relation to the throat. Whilst the construction of the conduit 15 has been described as being axial within the shaft and consequently in relation to the throat this is not by any means intended as a limitation as various constructions are possible where either the axis of the throat or of the tube may not always coincide with one another or with that of the furnace. Further, the angles of the cones, both the one converging upwards and the one diverging upwards can be varied and this in turn may affect the variation in product. Furthermore, instead of a single throat there may be a plurality of throats through which the reactants are passed in parallel.

It will be understood also that whilst the ducting 15 has been shown with an opening 16, this point of ingress of the titanium tetrachloride is capable of many variations in which, for instance, the titanium tetrachloride may be introduced through a plurality of ports which may be directed parallel to the axis of the shaft or may be directed at various angles so as for instance to produce a rotary motion of the gases. Furthermore, the port of entry or the ports of entry may be protected by suitable devices to avoid the falling of sand settling from the reaction zone through the throat into the ducting 15.

It will also be seen that whilst this process is described mainly for the production of titanium dioxide of pigment quality, that is to say of material of the order of 0.1–0.5 micron, it may be used for making particles of larger or lower size ranges if required, as, for instance, the large particle size quality is more desirable for use in the production of certain ceramic ware and especially in the vitreous enamel industry. It will also be clear that the process is adapted for making titanium oxide in both the anatase and the rutile forms. The operations may, for instance, be controlled especially in respect of rutilisation of the reaction product by the introduction into the oxygen stream of varying proportions of moisture, i.e. from 0.1–5%. The particle size may also be controlled by the addition of other materials, as for instance, by the addition of 1–5% of silicon tetrachloride. Other materials which have been found suitable for making variations in the pigment product include the addition of aluminum chloride so as to deposit alumina on the pigment.

The following is given as an example of operation using apparatus of the nature shown in the drawing:

EXAMPLE

A shaft furnace, internally of 4" diameter and 37" height, constructed in refractory concrete and electrically heated externally, has, at its base, a perforated ceramic plate ½" thick, surmounting a perforated metal plate, below which is a wind box for the admission through the plate of oxygen. 4½" above the top of the ceramic plate is constructed a throat which, at its narrowest point, has a diameter of 0.95" and is preceded and succeeded by conical sections convergent and divergent respectively each having an apex angle of about 60°. Passing through the ceramic plate axially with the furnace is a silica tube 1⅜" external, 1.1" internal diameter, and terminating 1½" below the throat. Inside this tube and near its upper extremity is inserted a gas permeable solids-impermeable plate (not shown in the drawing). The top of the furnace is sealed with a plate and the furnace has an outlet near to this upper end to conduct the discharge reactants to a suitable collecting vessel where they are cooled indirectly and the solid $TiO_2$ in suspension is filtered through terylene cloth. The chlorine so separated is passed on to a suitable absorbent (sulphur chloride) for subsequent regeneration.

400 gms. of sand of particle size mainly within the range of 90–160 microns is fed into the reactor above the ceramic plate to a static level corresponding to the height of the widest section of the convergent cone below the throat.

The procedure, in an experiment, was then as follows:

The whole furnace assembly was raised to 1000° C. by means of external electric heating and, meanwhile, the sand bed was fluidised by air passing upward through the wind box.

With the furnace thus preheated, the air supply was substituted by an oxygen supply at the rate of 20 litres per minute. Thereupon titanium tetrachloride which had been vapourised by heat to a temperature of 150° C. was injected into the furnace at the rate corresponding to 65 cc. of purified liquid $TiCl_4$ per minute.

Under these conditions, reaction was effected and by indirect recording, it was estimated that a temperature of about 1050° C. was maintained.

The reaction products were led to the collection chamber and the $TiO_2$ after filtration was examined.

The duration of the experiment was 22 minutes and the output was 860 gm. $TiO_2$. The $TiO_2$ content of the sand before the run was 1.8% of 400 gm., i.e., 7.2 gm. and after the run 5.8% of 417 gm., i.e., 24.2 gm. Thus 17 gm. was retained on the sand giving a retention of about 2% of the output.

The $TiO_2$ produced had an excellent white colour, a tinting strength of 860 and contained 22% of its composition in rutile form.

By contrast the same apparatus was employed without the throat and with titanium tetrachloride injected into a bed of 3000 gms. sand fluidised but not entrained by the oxygen fed from the wind box. The duration of the experiment was 40 minutes and the output was 845 gms. $TiO_2$. The build up of $TiO_2$ on the sand was 375 gms., which represents 44.5% $TiO_2$ retention on the sand.

The process of the present invention has been designed to be exploited especially in connection with the oxidation of titanium tetrachloride vapour, but it can be usefully applied in other processes of oxidation, particularly the oxidation of vapourised metal halides such as, for example, the oxidation of vapours of silicon chloride (silicon being considered for this purpose as a metal), aluminum chloride and zirconium chloride. It may also be applied to the oxidation of previously vapourised iron halides, especially ferric chloride. Indeed the process is widely applicable to exothermic reactions requiring substantial initial heating of at least one of the reactants apart from such heating as may be necessary merely to vapourise such reactant or reactants.

The process of the invention as applied to oxidation reactions may be stated as being a process for production of a metal oxide by reacting together the reactants: a vapourised oxidisable metal halide and oxygen, having the improvement which comprises establishing a dynamic bed of inert particles in an upwardly rising stream in at least one of said reactants, introducing the other reactant into said bed and sweeping the inert particles, the reactants, and their reaction products into a reaction zone maintained at a temperature high enough to cause the reactants to react and form said metal oxide whereby heat generated in the reaction zone is supplied to the particles, and thereafter separating the insert particles from the resulting metal oxide and returning said inert particles (while they are hot) to the bed and thereby supplying heat to the bed by means of said particles.

The term "dynamic bed," as used herein, is intended to include a bed or reaction zone in which the inert particles are suspended in an upwardly rising stream of gases flowing at a velocity sufficiently high either to maintain the particles in a so-called "fluidised" state or to entrain the particles and carry them forward as a part of the stream.

I claim:

1. In the process of producing metal oxide by vapour phase oxidation of a metal chloride, the improvement which comprises feeding a stream comprising oxidisable metal halide and oxygen to a first zone and then to an expanding deceleration zone, which first zone has a cross-sectional area, determined perpendicular to the flow of the stream, smaller than the cross-sectional area of the expanding deceleration zone, providing hot inert particles in said stream on entry to the expanding deceleration zone to thereby cause the metal halide and oxygen in the stream to come to a temperature at which the metal halide reacts with the oxygen to produce metal oxide suspended in halogen gas, decelerating said stream and suspension in the expanding deceleration zone thereby disengaging hot inert particles, directing the disengaged hot particles towards the portion of said stream in the first zone and removing the suspension from the expanding deceleration zone.

2. In the process of producing metal oxide by vapor phase oxidation of a metal chloride, the improvement which comprises introducing a stream comprising a mixture of oxidisable metal chloride vapour and gaseous oxidising agent to a constricting throat whereby to accelerate the velocity of the stream, thereafter feeding the stream to an expanding chamber whereby to decelerate the stream, providing hot inert particles in said stream on entry to the expanding chamber, transferring heat from said particles to said stream thereby bringing the mixture to oxidation temperature and producing a metal oxide-product gas suspension, disengaging hot particles from said suspension by deceleration of the stream and suspension in the expanding chamber, and recycling the particles towards the stream in the constricting throat and removing the suspension from the chamber.

3. The process of producing particulate titanium dioxide by reaction of titanium tetrachloride vapour with oxygen-containing gas, which comprises feeding at least one of said reactants to a bed of inert particles, removing a stream of said reactant and inert particles from said bed, introducing to said stream said other reactant, feeding the resulting stream to a constricting throat whereby to accelerate its velocity, passing the accelerated stream to an expanding chamber whereby to decelerate its velocity, providing sufficient heat in said stream to cause vapour phase oxidation of said titanium tetrachloride to produce a titanium dioxide-product gas suspension, removing titanium dioxide suspension from said chamber and causing hot inert particles in said suspension to be recycled from said suspension to contact further of said stream containing titanium tetrachloride vapour and oxygen-containing gas.

4. A process for the manufacture of titanium dioxide pigment which comprises burning titanium tetrachloride with oxygen substantially vertically upwardly as a jet stream through a reaction zone bounded by a fluid wall of downwardly cascading incandescent oversized titanium dioxide particles whereby titanium dioxide pigment is formed substantially out of contact with fixed surfaces.

5. A process for the manufacture of titanium dioxide pigment which comprises burning titanium tetrachloride with oxygen substantially vertically upwardly as a jet stream through a reaction zone bounded by a fluid wall of downwardly cascading incandescent oversized titanium dioxide particles.

6. A process for the production of titanium dioxide pigment which comprises reacting titanium tetrachloride and oxygen in an upwardly moving stream, entraining inert particles in the stream, decelerating the velocity of the gas stream as it rises to settle out and return downwardly around the periphery of the stream entrained inert particles while precipitated titanium dioxide finer than the inert particles remain suspended in the stream.

7. A process for the manufacture of titanium dioxide pigment which comprises burning titanium tetrachloride with oxygen substantially vertically upwardly as a stream through a reaction zone bounded by a fluid wall of downwardly cascading incandescent oversized titanium dioxide particles whereby titanium dioxide pigment is formed substantially out of contact with fixed surfaces.

8. A process for the manufacture of titanium dioxide pigment which comprises burning titanium tetrachloride with oxygen substantially vertically upwardly as a stream through a reaction zone bounded by a fluid wall of downwardly cascading incandescent oversized titanium dioxide particles.

9. A process for the manufacture of titanium dioxide pigment which comprises burning titanium tetrachloride with oxygen substantially vertically upwardly as a stream through a reaction zone bounded by downwardly cascading incandescent oversized titanium dioxide particles whereby titanium dioxide pigment is formed substantially out of contact with fixed surfaces.

10. A process for the manufacture of titanium dioxide pigment which comprises burning titanium tetrachloride with oxygen substantially vertically upwardly as a stream through a reaction zone bounded by downwardly cascading incandescent oversized titanium dioxide particles.

11. A process for the manufacture of titanium dioxide pigment which comprises burning titanium tetrachloride with oxygen substantially vertically upwardly as a jet stream through a reaction zone bounded by downwardly cascading incandescent oversized titanium dioxide particles whereby titanium dioxide pigment is formed substantially out of contact with fixed surfaces.

12. A process for the manufacture of titanium dioxide pigment which comprises burning titanium tetrachloride with oxygen substantially vertically upwardly as a jet stream through a reaction zone bounded by downwardly cascading incandescent oversized titanium dioxide particles.

References Cited

UNITED STATES PATENTS

| 2,760,846 | 8/1956 | Richmond et al. | 23—202 |
| 2,828,187 | 3/1958 | Evans et al. | 28—202 |
| 3,022,137 | 2/1962 | Nelson | 23—202 |

EDWARD STERN, Primary Examiner

U.S. Cl. X.R.

23—1, 139, 140, 142, 182, 200, 277